(12) United States Patent
Kelsey

(10) Patent No.: US 11,643,888 B2
(45) Date of Patent: May 9, 2023

(54) SOLIDS AND LIQUIDS MANAGEMENT SYSTEM AND APPARATUS FOR OIL AND GAS WELL DRILLING

(71) Applicant: ALLY ONSITE, Brighton, CO (US)

(72) Inventor: Zachary E. T. Kelsey, Windsor, CO (US)

(73) Assignee: Innovative Solutions, Ltd., Brighton, CO (US)

( * ) Notice: Subject to any disclaimer, the term of this patent is extended or adjusted under 35 U.S.C. 154(b) by 599 days.

(21) Appl. No.: 16/579,057

(22) Filed: Sep. 23, 2019

(65) Prior Publication Data

US 2021/0087896 A1    Mar. 25, 2021

(51) Int. Cl.
| | | |
|---|---|---|
| *E21B 21/06* | (2006.01) | |
| *B01D 21/26* | (2006.01) | |
| *B01D 21/24* | (2006.01) | |

(52) U.S. Cl.
CPC ........ *E21B 21/065* (2013.01); *B01D 21/2461* (2013.01); *B01D 21/262* (2013.01); *B01D 2221/04* (2013.01)

(58) Field of Classification Search
CPC ..... E21B 21/063; E21B 21/065; E21B 21/066
See application file for complete search history.

(56) References Cited

U.S. PATENT DOCUMENTS

| | | |
|---|---|---|
| 4,992,167 A | 2/1991 | Uchiyama |
| 5,814,230 A | 9/1998 | Willis et al. |
| 8,528,665 B2 | 9/2013 | Jackson et al. |
| 2003/0019538 A1 | 1/2003 | Sridhar |
| 2013/0323005 A1 | 12/2013 | Rexius et al. |

FOREIGN PATENT DOCUMENTS

WO    2015081878    6/2015

OTHER PUBLICATIONS

Elgin Separation Solutions, "Vertical Cuttings Dryers".
Kayden Centrifuges and Solid's Control, Kayden telescoping horizontal certrifuge.
Clean Harbors "Auger Tank Technology".
Vertical Drier Drawings.
Elgin Separation Solutions, "Vertical Cuttings Dryer".
Kayden Centrifuges and Solid's Control, Kayden telescoping horizontal centrifuge.
Total Oilfield Rentals LP, "Decanter Centrifuge Lynx 400P".
Clear Water Products "Technology".
MI Swaco "Optm-izer".

(Continued)

*Primary Examiner* — Robert E Fuller
(74) *Attorney, Agent, or Firm* — Mitchell Intellectual Property Law, PLLC

(57) ABSTRACT

A vertical dryer system and method for managing oil well solids and liquids includes a vertical dryer; a hopper for well drilling cuttings mixed with residual liquids; and an enclosed drag chain conveyor having an opening into the hopper for picking up drill cuttings and associated liquids. The enclosed drag chain conveyor extends from the hopper to a vertical dryer, there being an opening in said enclosed drag chain located at said vertical dryer, whereby drilling cuttings and associated fluids being conveyed by said drag chain are delivered to said vertical dryer for drying. The enclosed drag chain conveyor returns again to said hopper in a continuous enclosed loop except for the openings.

20 Claims, 9 Drawing Sheets

(56) References Cited

OTHER PUBLICATIONS

Capex Oilfield "Hydraulic Centrifuge Stands".
Newalta "Environmental Services".
Fluid-Pro LLC, Solids Control Services & Equipmental Rentals.
Clean Harbors Auger Tank Technology webpage.
BOS Solutions "BOS Hydraulic Centrifuge Stand".
BOS Solutions "BOS IV Tank System".
BOS Solutions "Bos III Tank System".
Halliburton "Vertical Cuttings Dryer and Centrifuge".
Brightway Solids Control "Vertical Cuttings Dryer".
Hapman screenshot Tubular Conveyor.

SOLIDS AND LIQUIDS MANAGEMENT SYSTEM AND APPARATUS FOR OIL AND GAS WELL DRILLING

FIELD OF THE INVENTION

The present invention relates to the field of managing solids and liquids in oil and gas well drilling.

BACKGROUND OF THE INVENTION

In the process of drilling wells, well bore drilling fluids are pumped downhole from the well drilling platform. These drilling fluids lubricate the drill bit and carry away cuttings generated as the drill bit digs. Exemplary drilling fluids are oil base fluids, brine base fluids, or water-based fluids. Drill cuttings (typically small pieces of shale or rock and other solids) are carried by the drilling fluid from the well bore in a return flow stream to a primary separator. The primary separator performs an initial separation of the fluids from the solids. Once separated from the solids, the drilling fluids may be reused.

It is not usually possible to separate all the solids from the drilling fluids with a primary separator. There are several types of primary separators, but "shale shakers" are commonly used. Generally, the primary separators are only able to separate 60-70% of contaminant solids from drilling fluids.

Often, the solids are simply too small to be separated. Additionally, drilling fluids are frequently formulated to contain finely ground solid additives that a primary separator cannot distinguish from fine drill cuttings, known as low gravity solids. Barite, a well know weighting agent, is one example of such solid additives.

From the primary separator, the separated moisture carrying drill cuttings are fed by an auger conveyor or by a front loader to the hopper of a vertical dryer. The vertical dryer uses centrifugal force to further separate solid drill cuttings from residual liquids and fine solid additives. The dried drill cuttings are sent to waste, and the separated liquids and fine solids are then typically saved for reuse in the drilling fluid.

SUMMARY OF THE INVENTION

A vertical dryer system and method for managing oil well solids and liquids includes a vertical dryer; a hopper for well drilling cuttings mixed with residual liquids; and an enclosed drag chain conveyor having an opening in said hopper for picking up drill cuttings and associated liquids. The enclosed drag chain conveyor extends from the hopper to a vertical dryer, there being an opening in said enclosed drag chain located at said vertical dryer, whereby drilling cuttings and associated fluids being conveyed by said drag chain are delivered to said vertical dryer for drying. The enclosed drag chain conveyor returns again to said hopper in a continuous enclosed loop except for said opening in said hopper and said opening to said vertical dryer.

These and other objects, features and advantages of the invention will be more fully understood and appreciated by reference to the Description of the Preferred Embodiments and the supporting drawings.

DESCRIPTION OF THE PREFERRED EMBODIMENT

Figure 1:
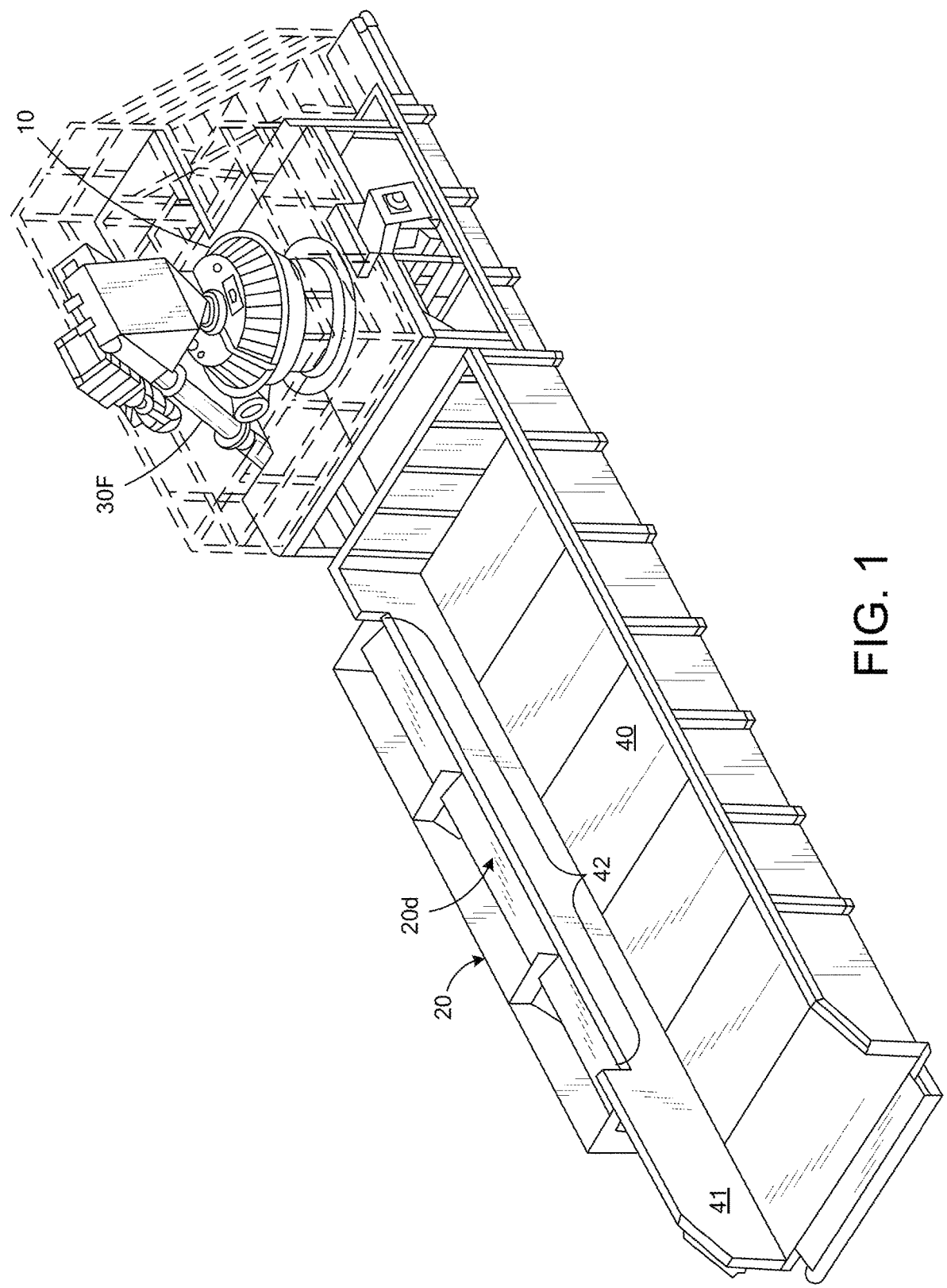
FIG. 1 is an elevated perspective view of the preferred embodiment apparatus.
Figure 2:
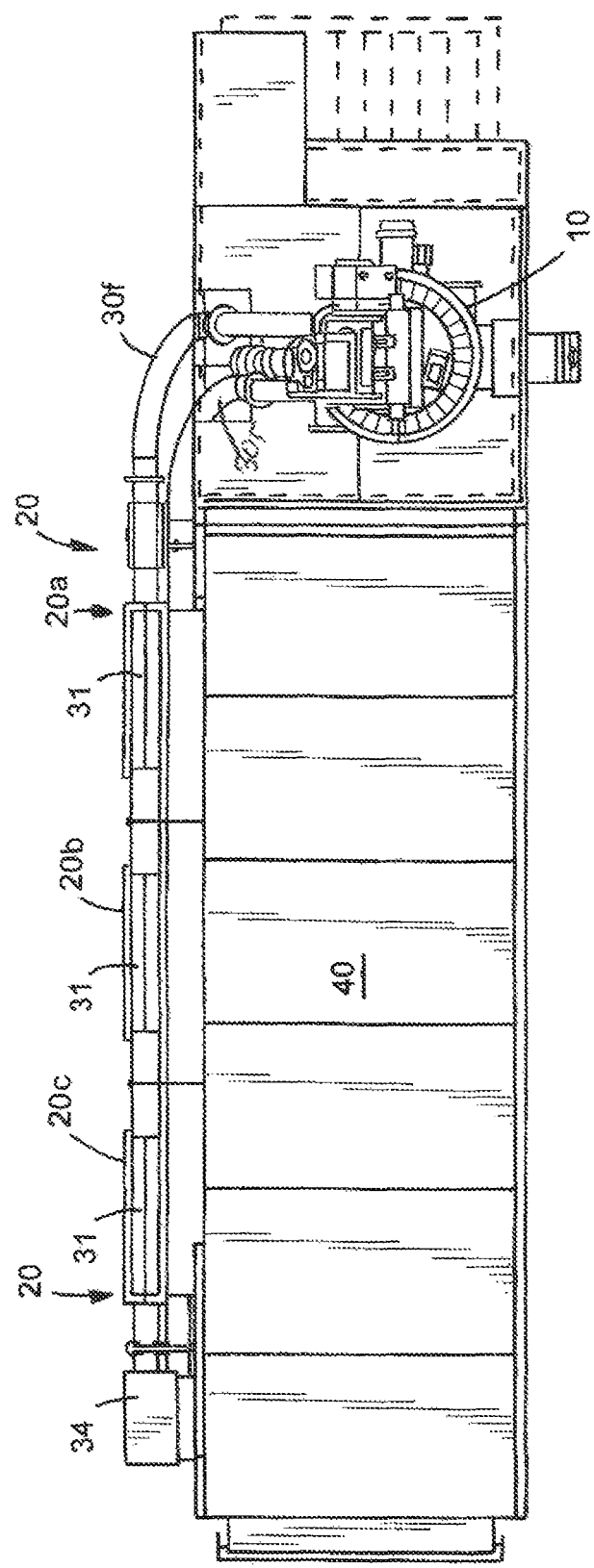
FIG. 2 is a plan view of the apparatus.
Figure 4:
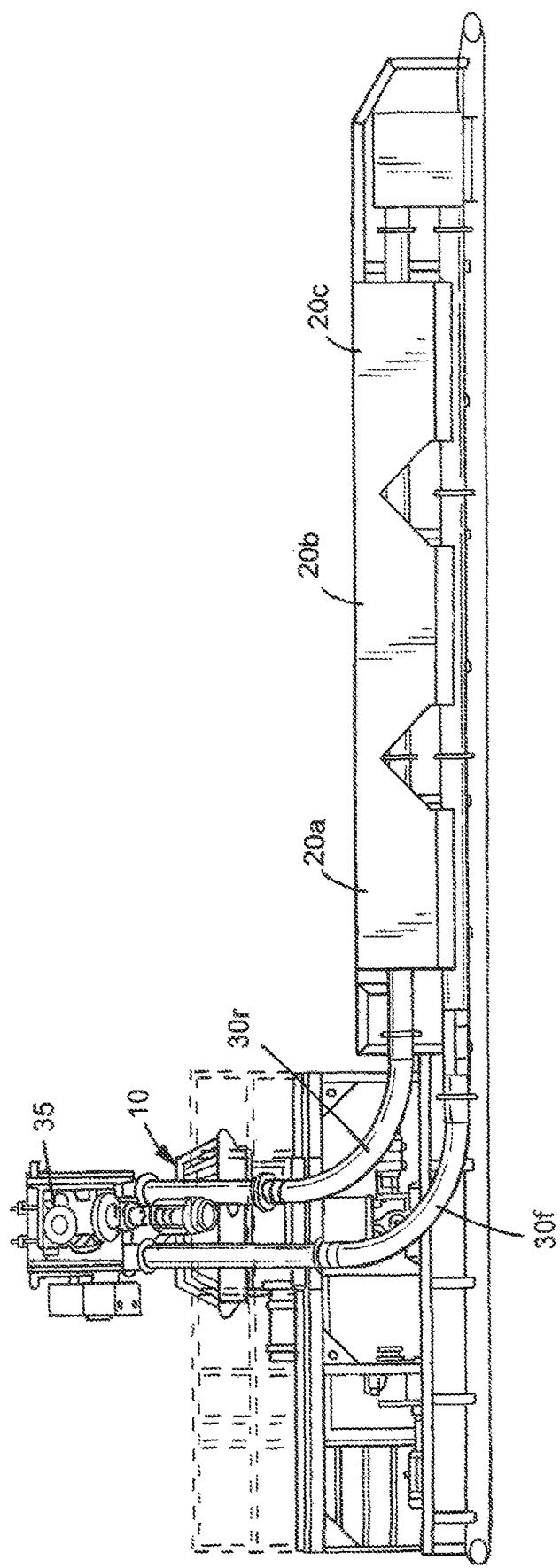
FIG. 4 is side elevational view of the apparatus.

In the preferred embodiment, vertical dryer system includes vertical dryer 10 and a hopper 20 for well cuttings with residual liquids, an enclosed drag chain conveyor 30 for conveying cuttings via a feeder leg 30f from hopper 20 to the top of said vertical dryer 10, where it dumps the cuttings into dryer 10 via an enclosed chute 11 (FIGS. 1, 2, 4, 6 and 7), A return leg 30r facilitates return of the drag chain conveyor to the end of hopper 20 and back through it in a continuous loop. Drag chain conveyor is enclosed, except for openings 31 located in said hopper 20 so the drag chain picks up cuttings as it passes through hopper 20, and an opening above said vertical dryer for delivering drill cuttings into chute 11 and on into said vertical dryer 10 (FIG. 4). An overflow container 40 is provided, in case said vertical dryer 10 or said enclosed drag conveyor 20 is out of order, or in the event the vertical dryer is not needed (FIGS. 1 and 2). The following parts list identifies the various components and parts discussed herein:

PARTS LIST 10 vertical dryer
  11 enclosed chute into vertical dryer
  12 enclosed efflux tube from dryer 10 to fluid receiving tank
  13 enclosed fluid receiving tank
  14 conveyor for dried cuttings
20 cuttings hopper
  20a, 20b, 20c sections of cutting hopper 20
  20d leg of hopper 20 extending outwardly from connection to overflow container 40
  20e leg of hopper 20 extending downwardly from leg 20d
  21 hinged cover
30 enclosed drag chain conveyor
  30f feeder leg of conveyor 30
  30r return leg of conveyor 30
  30a enclosing tube
  31 openings in cuttings hopper
  32 chain
  33 pick-up discs
  34 feeder gear box and drive motor unit
  35 return gear box
40 overflow container
  41 side wall
  42 cutaway Vertical dryers separate liquids and fines from drill cuttings by centrifugal force. They include a top opening through which cuttings can be fed into the dryer. The centrifuge forces liquids and fines to the outside wall of the centrifuge while the dried cuttings drop down along the vertical axis of the dryer. Any of the commercial vertical dryers can be used in the present invention. They can be used for water-based drill cuttings (shale or clay), oil-based cuttings, mineral slurry dewatering and the like.

Figure 6:
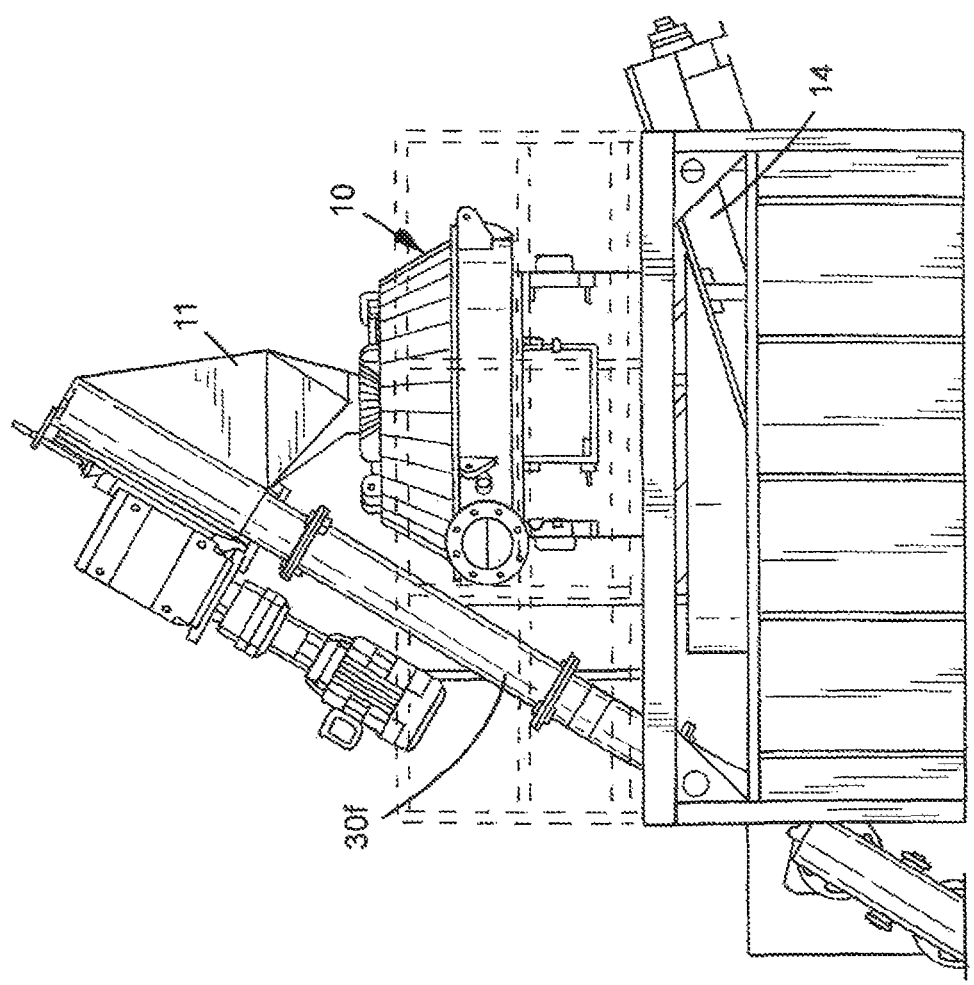
FIG. 6 is an enlarged elevation of the vertical dryer portion of the apparatus.
Figure 7:
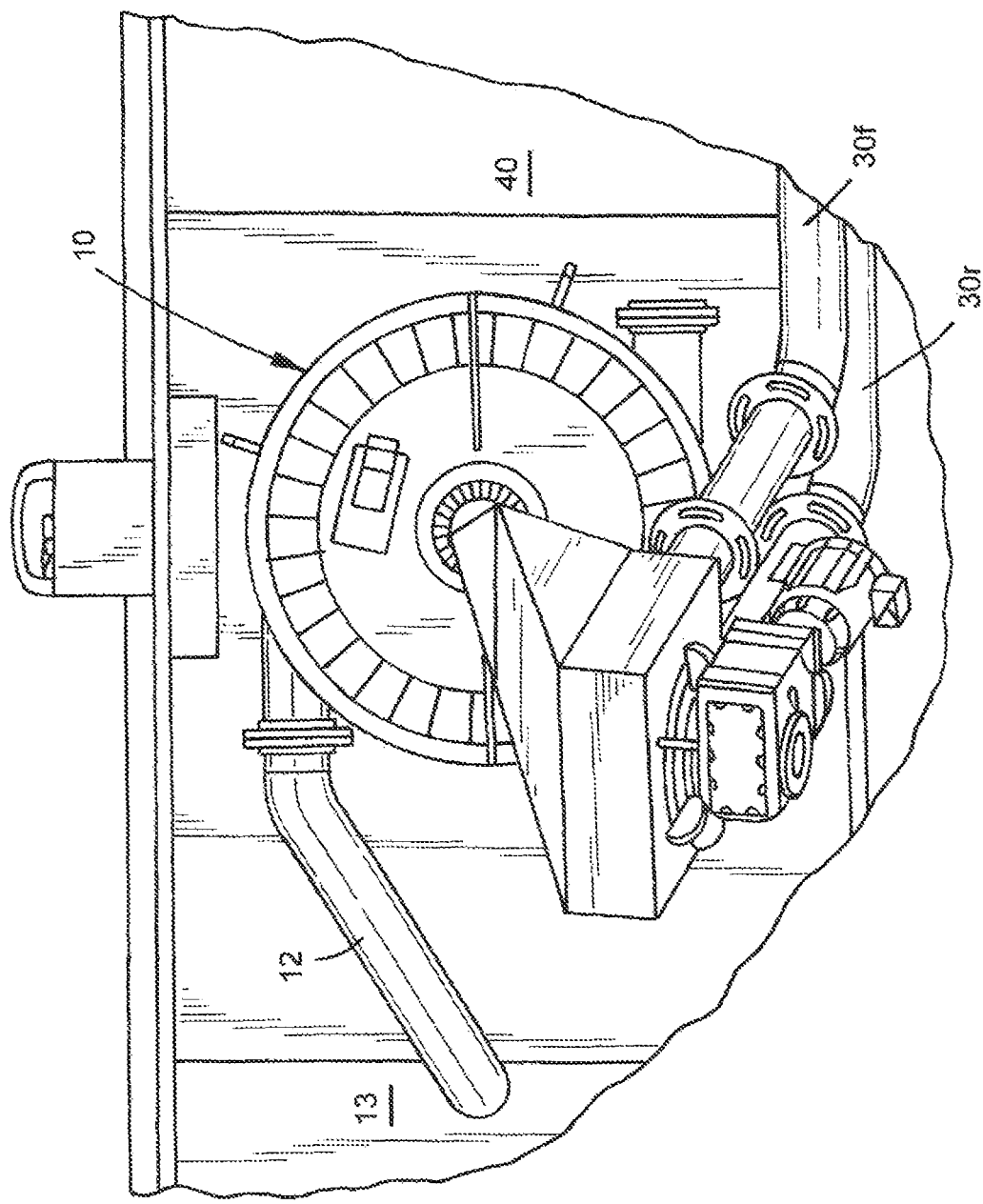
FIG. 7 is a plan view of the vertical dryer portion of the apparatus.

In the preferred embodiment, the vertical dryer is equipped with a chute 11 which conducts the cuttings from an emptying opening in enclosed conveyor 30 at the top of conveyor leg 30f, down through the chute and into the interior of vertical dryer 10 (FIGS. 1 and 6). An enclosed efflux tube 12 extends from dryer 10 to an enclosed fluid receiving tank 13 (FIG. 7) for conveying separated fluids and additive fines. From enclosed tank 13, these fluids and fines can then be pumped into cutting fluid mixers where they are re-introduced into the cutting fluid. The dried cuttings drop down from the center of dryer 10 onto an auger or other type of conveyor 14 where they are conveyed to dried waste cuttings storage for disposal (FIG. 6).

Figure 5:
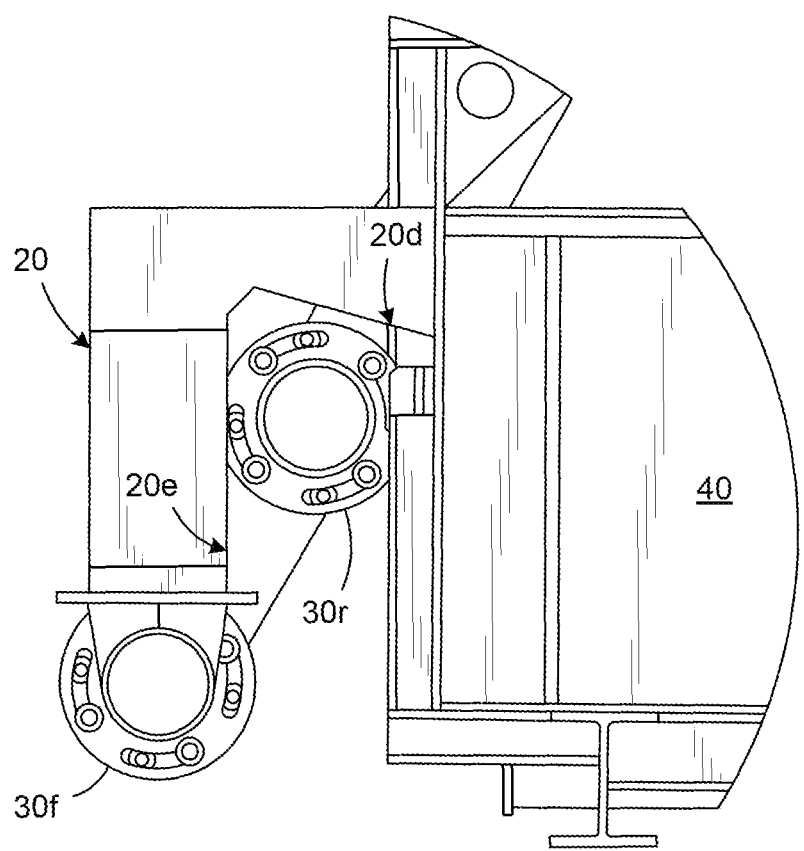
FIG. 5 is a cross sectional view taken on plane IV-IV of FIG. 5.

Cuttings hopper 20 is secured to one side of overflow container 40 (FIGS. 1 and 2). It is generally of an inverted "L" shape in cross section, such that the leg 20d of the hopper extends outwardly from its connection to container 40, and then downwardly as leg 20e (FIG. 5). At its bottom, hopper 20 is secured to and opens into openings in leg 30f of drag chain conveyor 30. Return leg 30r passes through the space between leg 20e of hopper 20 and the side wall of container 40. Hopper 20 is segmented into three sections 20a, 20b and 20c in order to provide spacing for flanges connecting segments of drag chain conveyor 30 where it extends between said sections (FIG. 4).

Figure 8A:
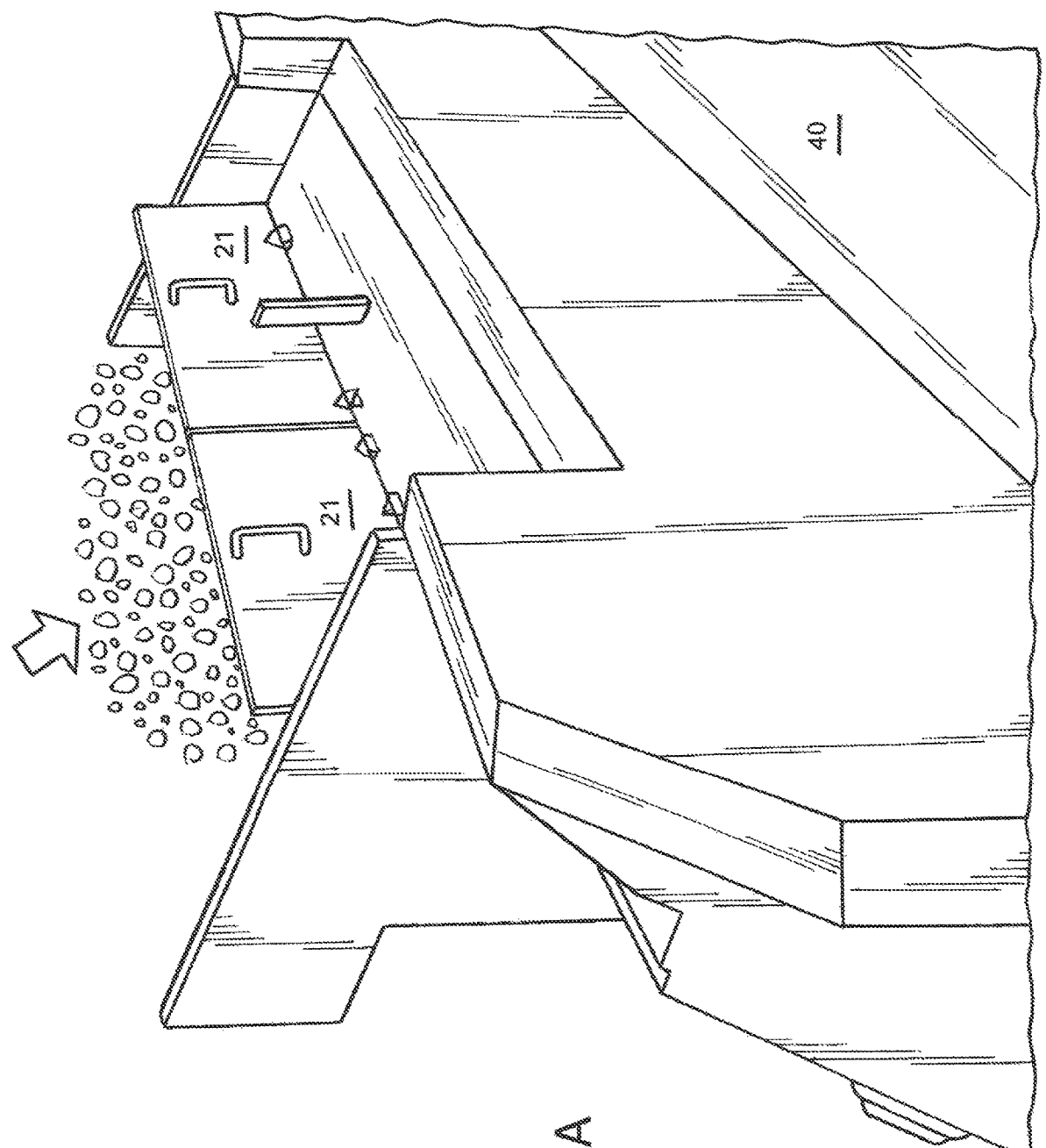
FIGS. 8A and 8B are perspective views of the cuttings hopper with its cover opened and closed, respectively.
Figure 8B:
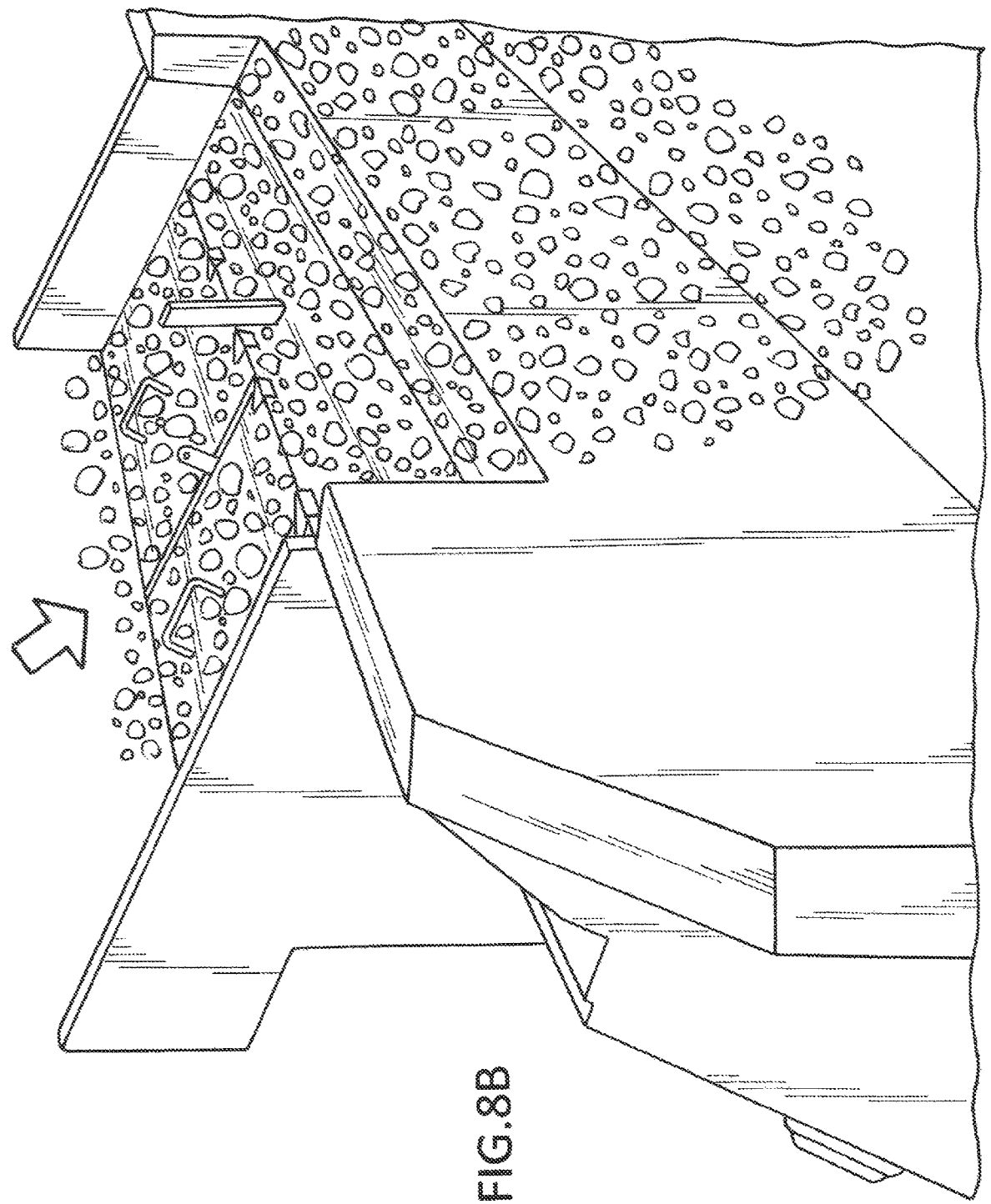

Hopper 20 includes a hinged cover 21, which when opened allows fluid carrying drill cuttings to flow into hopper 20 (FIG. 8A). When closed, the cuttings being fed slide over the top of hopper 20 and into overflow container 40 (FIG. 8B). Cover 21 is inclined to the horizontal when closed, to facilitate cuttings sliding over it and into container 40.

Figure 3:
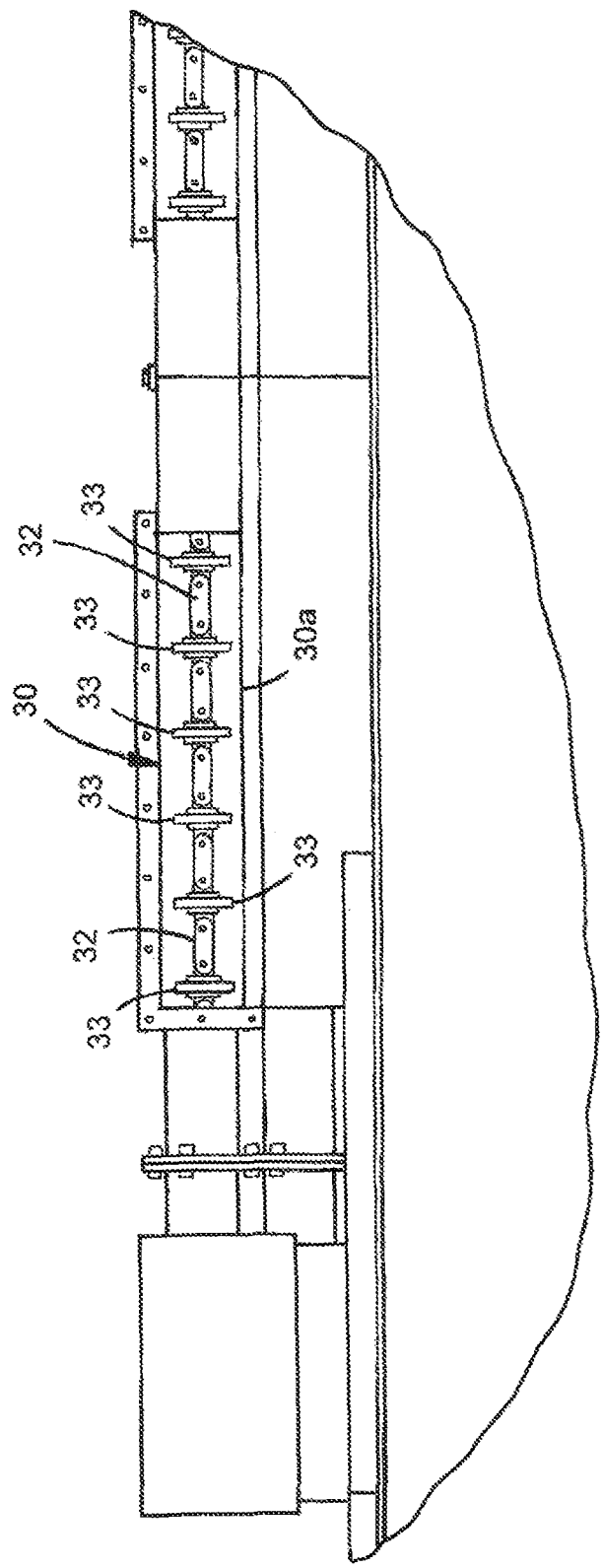
FIG. 3 is an enlarged view of the indicated portion of FIG. 2.

Enclosed drag chain conveyor 30 comprises an enclosing tube 30a within which travels a chain 32, having pickup discs 33 secured at spaced points along said chain, usually spaced about a foot apart (FIG. 3). Pickup discs 33 have a diameter which matches the inside diameter of enclosing tube 30a such that material which is picked up through the openings 31 in enclosing tube 30a is conveyed by discs 33 as they travel through enclosing tube 30a. Drag conveyor discs 33 are 3-12 inches in diameter. The preferred embodiment chain uses 8-inch diameter discs 33 and a corresponding inside diameter in tube 30a.

Drag chain conveyor 30 uses a continuous chain 32 which passes around a feeder gear box 34 at the end of hopper 20 and begins its return to upper gear box 35 located at the top of chute 11 (FIG. 4). Gear box 35 is connected to chute 11 in such a way that the entire assembly is enclosed. Gear box 34 includes a drive motor which drives conveyor chain 32.

Overflow container 40 is a three-sided metal container with a heavy-duty metal floor (FIG. 1). The side wall 41 to which hopper 20 is secured has a cutaway 42 at the top for the distance of hopper 20, through which cuttings can flow over covered hopper 20 and into overflow tank 40.

When the system is in use, fluid laden drill cuttings flow into open hopper 20, where they are picked up through enclosed drag chain openings 31 by the passing enclosed drag chain 32 through hopper 20. They are conveyed upwardly through enclosed drag chain conveyor leg 30f to the opening into chute 11, which feeds the drill cuttings into the top of vertical dryer 10. Vertical dryer centrifugally separates the fluids and fines from the cuttings and feeds the fluids and fines through pipe 12 into enclosed container 13. The cuttings drop down onto disposal conveyor 14 which conveys the cuttings to a disposal container or site. Drag chain conveyor 30 continues to travel through the enclosed conveyor return leg 30f back to the gear box 34 which turns the return loop around into a feeder loop.

Because drag chain conveyor 30 is enclosed, and its connection to vertical dryer 10 through chute 11 is enclosed, volatile contaminants (VOCs) can be prevented from escaping to the atmosphere. In a preferred embodiment, a vacuum is placed on the system to vacuum VOCs away to a scrubber for treating and eliminating them. A preferred location for the vacuum system would be at the top of vertical dryer 10, and of course connected both to vertical dryer 10 and to feeder chain 30.

The fact that feeder chain 30 is enclosed and its connection to chute 11 and vertical dryer 10 is enclosed also makes the operation of the preferred system much cleaner. Messy spills are minimized.

Of course, it is understood that the above are preferred embodiments of the invention and that various changes and alterations can be made without departing from the spirit and scope of the invention as set forth in the appended claims.

The invention claimed is:

1. A vertical dryer system for managing oil well solids and liquids comprising: a vertical dryer; a hopper for well drilling cuttings mixed with residual liquids and drill fluid fines; an enclosed drag chain conveyor extending through said hopper and having at least one opening located in said hopper for picking up drill cuttings and associated liquids; said enclosed drag chain conveyor extending from said hopper to a vertical dryer, there being an opening in said enclosed drag chain conveyor located at said vertical dryer, whereby drilling cuttings and associated fluids being conveyed by said enclosed drag chain conveyor are delivered to said vertical dryer for drying; said enclosed drag chain conveyor returning again to said hopper in a continuous enclosed loop except for said at least one opening located in said hopper and said opening located at said vertical dryer.

2. The vertical dryer system of claim 1 in which: said opening located at said vertical dryer opens into an enclosed chute, wherein the enclosed chute directs drill cuttings into said vertical dryer without allowing volatile organic compounds (VOCs) to escape to atmosphere.

3. The vertical dryer system of claim 2 further comprising: an enclosed efflux tube extending from said vertical dryer to an enclosed fluid receiving tank for conveying separated fluids and additive fines to said enclosed receiving tank without allowing VOCs to escape to atmosphere.

4. The vertical dryer system of claim 3 further comprising: a vacuum system for placing a vacuum on the vertical dryer system to vacuum VOCs away to a scrubber.

5. The vertical dryer system of claim 4 in which said vacuum system is located at the top of said vertical dryer and connected both to said vertical dryer and to said enclosed drag chain conveyor.

6. The vertical dryer system of claim 5 in which: said hopper is located at a lower level than said vertical dryer and said enclosed drag chain conveyor extends upwardly to said opening into said vertical dryer.

7. The vertical dryer system of claim 1 further comprising: an overflow container; said hopper being secured to one side of overflow container, said hopper including a gate which when open allows cuttings and associated fluids and fines to flow into said hopper, and when closed allows cuttings and associated fluids and fines to flow into said overflow container.

8. The vertical dryer system of claim 7 in which said hopper is of an inverted shape in cross section, having a top horizontal leg and a downwardly extending vertical leg; said top horizontal leg being connected to said overflow container and extending outwardly therefrom, said enclosed drag chain conveyor returning from said vertical dryer to said hopper by passing between said downwardly extending vertical leg of said hopper and said overflow container, and reversing direction at a gear box so as to pass through said hopper and on again to said vertical dryer.

9. The vertical dryer system of claim 1 in which said enclosed drag chain conveyor comprises an enclosing tube, a chain within said enclosing tube, a drive for moving said chain through said enclosing tube, and discs connected to said chain at spaced intervals; said discs conforming in shape to the cross section of said enclosing tube, whereby as said chain is driven through said hopper, said drag chain conveyor picks up drill cuttings and associated fluids and fines from said hopper through said at least one opening located in said hopper, and conveys them to said opening located at said vertical dryer where it releases the drill cuttings and associated fines into said vertical dryer.

10. The vertical dryer system of claim 9 in which: said hopper is located at a lower level than said vertical dryer and said enclosed drag chain conveyor extends upwardly to said opening into said vertical dryer.

11. The vertical dryer system of claim 10 in which: said opening located at said vertical dryer opens into an enclosed chute, wherein said enclosed chute directs drill cuttings into said vertical dryer without allowing VOCs to escape to atmosphere.

12. The vertical dryer system of claim 11 further comprising: an enclosed efflux tube extending from said vertical dryer to an enclosed fluid receiving tank for conveying separated fluids and additive fines to said enclosed receiving tank without allowing VOCs to escape to atmosphere.

13. The vertical dryer system of claim 12 further comprising: a vacuum system for placing a vacuum on the vertical dryer system to vacuum VOCs away to a scrubber.

14. The vertical dryer system of claim 13 in which said vacuum system is located at the top of said vertical dryer and connected both to said vertical dryer and to said enclosed drag chain conveyor.

15. The vertical dryer system of claim 9 further comprising; an overflow container; said hopper being secured to one side of overflow container, said hopper including a gate which when open allows cuttings and associated fluids and fines to flow into said hopper, and when closed allows cuttings and associated fluids and fines to flow into said overflow container.

16. The vertical dryer system of claim 15 in which: said hopper is located at a lower level than said vertical dryer and said enclosed drag chain conveyor extends upwardly to said opening into said vertical dryer.

17. A method for managing oil well solids and liquids comprising: providing the vertical dryer system set forth in claim 1; introducing drill cuttings and associated fluids into said hopper; activating said enclosed drag chain conveyor to convey said drill cuttings and associated fluids to said vertical dryer, and activating said vertical dryer to separate said fluids from said drill cuttings, and reintroducing said fluids into a drilling fluid mix.

18. The method of claim 17 further comprising providing an enclosed chute for directing drill cuttings into said vertical dryer without allowing VOCs to escape to atmosphere.

19. The method of claim 18 further comprising providing an enclosed efflux tube extending from said vertical dryer to an enclosed fluid receiving tank for conveying separated fluids and additive fines to said enclosed receiving tank without allowing VOCs to escape to atmosphere.

20. The method of claim 19 further comprising placing a vacuum on said system to vacuum VOCs away to a scrubber.

* * * * *